US008055712B2

(12) United States Patent
Kagawa et al.

(10) Patent No.: US 8,055,712 B2
(45) Date of Patent: Nov. 8, 2011

(54) SYSTEM FOR ASSISTING COLLABORATIVE ACTIVITY

(75) Inventors: Masaaki Kagawa, Tokyo (JP); Laszlo Kovacs, Budapest (HU); Andras Micsik, Budapest (HU); Balazs E Pataki, Budapest (HU)

(73) Assignee: Ricoh Company, Ltd., Tokyo (JP)

( * ) Notice: Subject to any disclaimer, the term of this patent is extended or adjusted under 35 U.S.C. 154(b) by 376 days.

(21) Appl. No.: 12/400,002

(22) Filed: Mar. 9, 2009

(65) Prior Publication Data

US 2009/0235182 A1    Sep. 17, 2009

(30) Foreign Application Priority Data

Mar. 17, 2008    (JP) .................................. 2008-068141

(51) Int. Cl.
    G06F 15/16    (2006.01)
(52) U.S. Cl. ..................... 709/205; 709/225; 715/751
(58) Field of Classification Search .................. None
    See application file for complete search history.

(56) References Cited

U.S. PATENT DOCUMENTS

| | | | | |
|---|---|---|---|---|
| 5,754,857 | A * | 5/1998 | Gadol | 709/203 |
| 6,539,404 | B1 * | 3/2003 | Ouchi | 715/205 |
| 6,618,756 | B1 * | 9/2003 | Katsurabayashi | 709/224 |
| 6,678,698 | B2 * | 1/2004 | Fredell et al. | 707/608 |
| 6,728,762 | B1 * | 4/2004 | Estrada et al. | 709/218 |
| 7,483,841 | B1 * | 1/2009 | Jin et al. | 705/7.11 |
| 7,640,548 | B1 * | 12/2009 | Yu et al. | 718/106 |
| 7,729,924 | B2 * | 6/2010 | Setya | 705/345 |
| 7,756,724 | B2 * | 7/2010 | Gropper et al. | 705/2 |
| 2002/0029161 | A1 * | 3/2002 | Brodersen et al. | 705/9 |
| 2004/0267871 | A1 | 12/2004 | Pratley et al. | |
| 2005/0289234 | A1 * | 12/2005 | Dai et al. | 709/229 |
| 2006/0026235 | A1 * | 2/2006 | Schwarz et al. | 709/205 |
| 2006/0069605 | A1 * | 3/2006 | Hatoun | 705/9 |
| 2006/0106846 | A1 * | 5/2006 | Schulz et al. | 707/101 |
| 2006/0117016 | A1 * | 6/2006 | Smith et al. | 707/9 |
| 2006/0167737 | A1 * | 7/2006 | Muller et al. | 705/9 |
| 2006/0277089 | A1 * | 12/2006 | Hubbard et al. | 705/9 |
| 2007/0006126 | A1 * | 1/2007 | Calkins et al. | 717/103 |
| 2007/0033571 | A1 * | 2/2007 | Moore et al. | 717/104 |
| 2007/0276714 | A1 * | 11/2007 | Beringer | 705/7 |

FOREIGN PATENT DOCUMENTS

| | | |
|---|---|---|
| JP | 2000-181956 | 6/2000 |
| JP | 3547159 | 7/2004 |
| JP | 2005-018791 | 1/2005 |
| JP | 2007-188143 | 7/2007 |
| KR | 2007043353 A * | 4/2007 |

* cited by examiner

Primary Examiner — Patrice Winder
(74) Attorney, Agent, or Firm — IPUSA, PLLC

(57) ABSTRACT

A system for assisting a collaborative activity includes a plurality of work interfaces, a role management unit, a workflow management unit, a collaborative activity registration unit, and an activity context management unit situated between the plurality of work interfaces and the collaborative activity registration unit to receive entered information from one of the work interfaces, to associate shared information contained in the entered information with user information provided by the role management unit and an activity content provided by the workflow management unit to create collaborative activity information, and to cause the collaborative activity registration unit to register the collaborative activity information.

7 Claims, 13 Drawing Sheets

| ITEM | VALUE | |
|---|---|---|
| ID | 0x0002 | ~200a |
| Parent | 0x0001 | ~200b |
| Data | Report.txt | ~200c |
| Name, Role | E, EDITOR | ~200d |
| Operation | MODIFY | ~200e |

SYSTEM FOR ASSISTING COLLABORATIVE ACTIVITY

BACKGROUND OF THE INVENTION

1. Field of the Invention

The disclosures herein generally relate to information processing technologies for assisting collaborative activity, and particularly relate to a collaborative-activity assisting apparatus, a collaborative-activity assisting system, a collaborative-activity assisting method, and a recording medium having a collaborative-activity assisting program embodied therein for providing an environment in which a plurality of users can share activity contexts indicative of shared information and activity statuses.

2. Description of the Related Art

In corporations as well as in government and national agencies, most work is performed by the people engaged in the work (who will hereinafter be referred to as "persons involved") such that they share various types of information to collaborate in the work. Especially in a project aimed toward attaining a particular objective, persons involved typically communicate with each other, and share documents, schedule information, task lists, calendar, etc. to perform collaborative work. As means to assist the progress of a project, various management tools are available, which include contents management systems, project management systems, workflow management systems, schedule management systems, and bulletin board systems (or mail systems).

Various types of information that are shared are separately managed by individual management tools, which is not satisfactory from the viewpoint of user friendliness. It is thus desired to develop a management tool that is more user-friendly. When a meeting regarding a given project is to be held, for example, various management tools need to be utilized to achieve the following tasks: (1) identifying the schedule of each person involved by use of a schedule management system; (2) registering documents needed in the meeting by use of a contents management system; (3) requesting a meeting by sending a mail indicative of the date and time of the meeting together with a link to the documents; (4) generating a document containing the minutes of the meeting after the meeting; (5) sending a mail providing a link to the minute document, and (6) entering the notice indicative of the completion of the meeting into a project management system. In this procedure, a person in charge needs to select a proper management tool by taking into account the procedure to switch applications. This requires cumbersome decision making processes and machine operations.

From the viewpoint of sharing of information in collaborative activity, appropriate information needs to be selectively shown depending on activity statuses as well as on the role and authority of persons involved. For a person involved who can access shared information, viewing all the shared information relating to the project at once is not convenient because it will then be necessary to search for information relevant to his/her own activities. For example, when a document is to be reviewed, a reviewer needs to access the document and review comments in order to add or modify the review comments. A manager who manages the entire project, however, may not need to access all the review comments, and may only need to check whether a review result is correctly reflected. By the same token, for a person who has got involved in a project halfway through, viewing all the information regarding project at once may not be convenient. It would be difficult to correctly grasp the progress status of the project unless all the updates are checked in a temporal sequence.

It is often the case that an individual belonging to an organization such as a corporation is engaged in plural projects or in plural activities of a single project. Such a person performs his/her work by switching the projects or the activities. In this case, there is a need to locate necessary information, which of course differs from project to project or from activity to activity. In a current situation, a person involved typically devises a mechanism by himself/herself, by which necessary information can be easily located.

Against this background, there have been attempts to develop a collaborative activity assisting system for which user-friendliness is improved. Japanese Patent Application Publication No. 2000-181956 (Patent Document 1) discloses an information management sharing system that uses only a typical Internet environment and browser to provide basic functions to various combinations of users and groups such that these basic functions are used in group activities to make announcements, to manage schedules, to use bulletin boards, and to manage tasks, addresses, links, and bookings. This information management sharing system stores information regarding individuals and information regarding organizations separately from each other for management purposes. When there are two or more organizations to which a given individual belongs, information is stored and managed separately for each organization. A user specifies access authorization for each organization, so that another user can access the information only if he/she belongs to an authorized organization. The information management sharing system is also provided with the function to request a task to be performed in a collaborative work and schedule.

Japanese Patent Application Publication No. 2005-18791 (Patent Document 2) discloses a method for managing and allowing collaborative activity data to be viewed from within the contexts of a shared electronic document. This method displays a document edit pane for editing a shared document, and also displays a collaborative activity pane for displaying collaborative activity data alongside the document edit pane. Collaborative activity data such as one or more participant identifiers, tasks, documents, links, and other relevant information are displayed in the collaborative activity pane. Through the collaborative activity pane, an action on any selected item of the collaborative activity data is performed.

Japanese Patent No. 3547159 (Patent Document 3) discloses a collaborative activity assisting system that provides a framework by which a partition configuration matching the characteristics of work is generated by providing, in a collaborative activity area on display screen, a work area that displays contents that do not necessarily match contents viewed by others. This collaborative activity assisting system provides, as collaborative activity areas, a content-based collaborative activity area for displaying the same contents, a format-based collaborative activity area having the same format, a theme-based collaborative activity area having only the same theme, and an individual activity area unique to each user.

Japanese Patent Application Publication No. 2007-188143 (Patent Document 4) discloses a collaborative editing management system that expands the functions of a contents management system serving as a base system to manage snapshots consistent through a plurality of pages and to manage comments separately for each version. This collaborative editing management system allows a document to be edited on a page-by-page basis, and manages the history of updates. The collaborative editing management system includes a means for receiving a request to generate a snapshot based on the indications of pages and a version, a means for generating a snapshot by putting together the pages of the specified version, a means for managing comments by associating these comments with the pages of the snapshot, and a means for displaying a page in response to a page display request.

The technology disclosed in Patent Document 1 is characterized by providing a Web-based interface and also characterized by the fact that the user-friendliness of schedule adjustment is improved in the management of various information items for communication such as announcements, schedules, bulletin boards, task management, address management, links, and booking management. This technology is not designed to manage activity contexts indicative of activity status in collaborative activity.

The technology disclosed in Patent Document 2 is characterized by improving the user-friendliness of notifying persons involved and viewing collaborative activity data in performing a collaborative activity while sharing the collaborative activity data. This technology is not designed to provide proper information depending on optimum activity contexts on a user-specific basis, and, thus, is not satisfactory in terms of user-friendliness.

The technology disclosed in Patent Document 3 is characterized by improving the user-friendliness of notifying persons involved in collaborative activity and presenting information on a user-role-specific basis. Since this technology is premised on the simultaneous work by persons involved, the users need to send notice explicitly. Further, this technology is not designed to present appropriate information depending on the activity contexts of users, and, thus, is not satisfactory from the viewpoint of user-friendliness.

The technology disclosed in Patent Document 4 serves to allow a document version to be managed. This technology, however, is not designed to present information regarding optimum activity contexts on a user-specific basis, and, thus, is not satisfactory from the viewpoint of user-friendliness. It is thus desirable to develop a technology that can provide high user-friendliness, and can assist a collaborative activity utilizing various types of shared information such as information about contents, projects, tasks, schedules, and communications.

Accordingly, there is a need for a collaborative activity assisting apparatus, a collaborative activity assisting system, a collaborative activity assisting method, and a recording medium having a collaborative activity assisting program embodied therein for performing integrated processing of the functions for assisting and managing a collaborative activity such as contents management, project management, workflow management, schedule management, and communication management. The collaborative activity assisting apparatus, the collaborative activity assisting system, the collaborative activity assisting method, and the recording medium having a collaborative activity assisting program embodied therein allow persons involved in collaborative activity to conveniently share information and activity contexts indicative of activity status of the collaborative activity. Further, the collaborative activity assisting apparatus, the collaborative activity assisting system, the collaborative activity assisting method, and the recording medium having a collaborative activity assisting program embodied therein allow each person to perform his/her activity by use of an appropriate function responsive to the activity status of his/her activity, thereby being able to assist the collaborative activity in a smooth, efficient, and user-friendly manner.

SUMMARY OF THE INVENTION

It is a general object of at least one embodiment of the present invention to provide a system, a method, and a machine-readable medium that substantially eliminate one or more problems caused by the limitations and disadvantages of the related art.

According to one embodiment, a system for assisting a collaborative activity includes: a plurality of work interfaces configured to provide work environments for shared information that is shared in the collaborative activity; a role management unit configured to manage user information obtained by defining for each user a role in the collaborative activity and an authority regarding the shared information; a workflow management unit configured to manage activity statuses by using a workflow defined by activity contents and a sequence thereof; a collaborative activity registration unit configured to register collaborative activity information regarding the collaborative activity, to which an identification value is assigned; and an activity context management unit situated between the plurality of work interfaces and the collaborative activity registration unit to receive entered information from one of the work interfaces, to associate the shared information contained in the entered information with the user information provided by the role management unit and an activity content provided by the workflow management unit to create the collaborative activity information, and to cause the collaborative activity registration unit to register the collaborative activity information.

According to one embodiment, a method of assisting a collaborative activity is performed by an apparatus including a plurality of work interfaces configured to provide work environments for shared information that is shared in the collaborative activity. The method includes: receiving, by use of an activity context management unit, entered information from one of the work interfaces; providing, from the activity context management unit to a collaborative activity registration unit, collaborative activity information obtained by associating the shared information contained in the entered information with user information and an activity content, the user information being provided by a role management unit for managing the user information and obtained by defining for a user a role in the collaborative activity and an authority regarding the shared information, and the activity content being provided by a workflow management unit for managing activity statuses by using a workflow defined by activity contents and a sequence thereof; and registering, by use of the collaborative activity registration unit, the collaborative activity information to which an identification value is assigned.

According to one embodiment, a machine-readable medium having a program embodied therein executable by an apparatus for assisting a collaborative activity is provided. The program causes the apparatus to function as: a plurality of work interfaces configured to provide work environments for shared information that is shared in the collaborative activity; a role management unit configured to manage user information obtained by defining for each user a role in the collaborative activity and an authority regarding the shared information; a workflow management unit configured to manage activity statuses by using a workflow defined by activity contents and a sequence thereof; a collaborative activity registration unit configured to register collaborative activity information regarding the collaborative activity, to which an identification value is assigned; and an activity context management unit situated between the plurality of work interfaces and the collaborative activity registration unit to receive entered information from one of the work interfaces, to associate the shared information contained in the entered information with the user information provided by the role management unit and an activity content provided by the workflow management unit to create the collaborative activity information, and to cause the collaborative activity registration unit to register the collaborative activity information.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention will be described. The embodiments are not limited to the examples illustrated in the following. In the present embodiment, a description will be given of an example in which a server apparatus 10 is used as a collaborative activity assisting apparatus.

Figure 1:
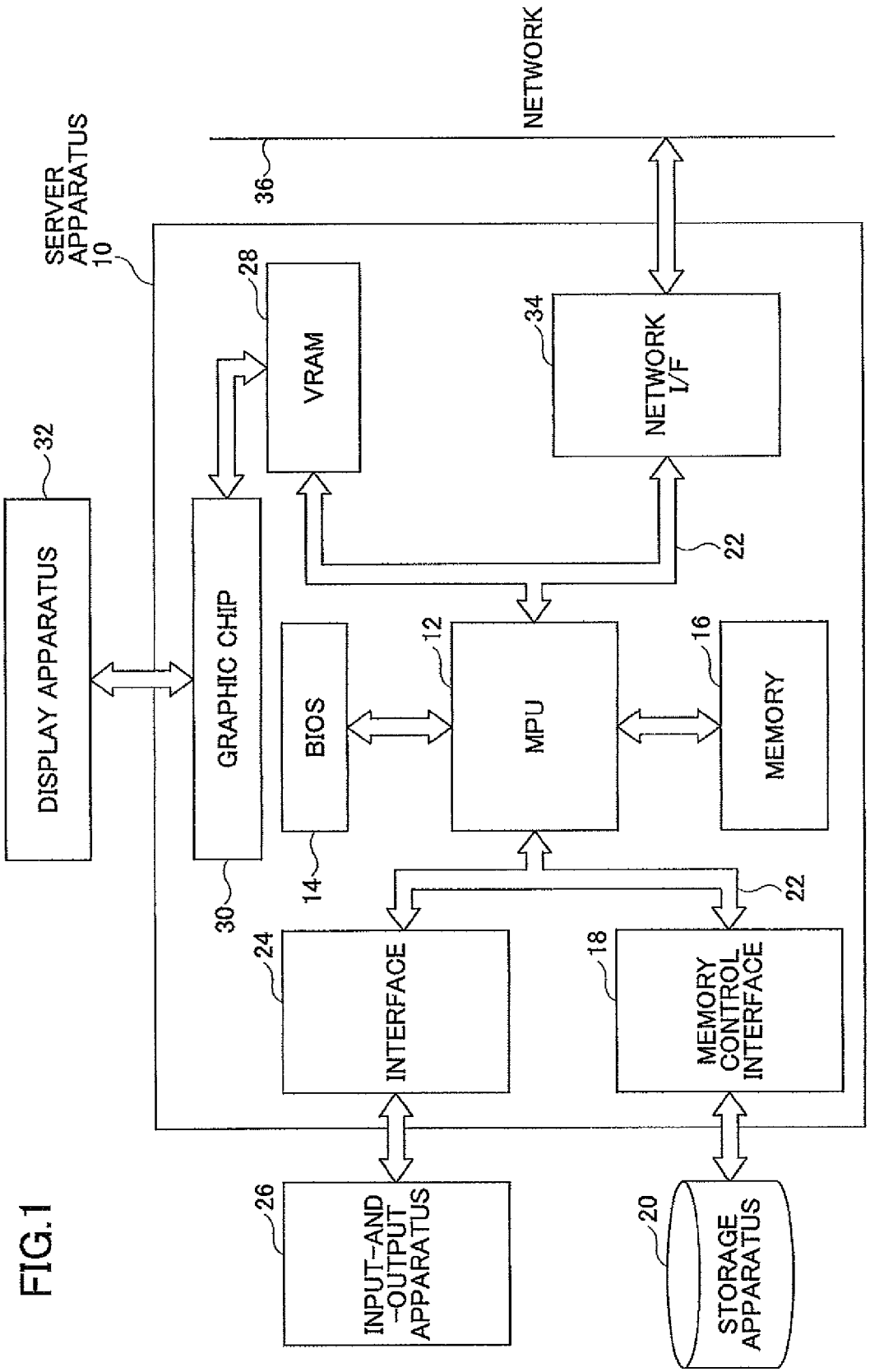
FIG. 1 is a drawing illustrating an embodiment of a schematic hardware configuration of the server apparatus.

FIG. 1 is a drawing illustrating an embodiment of a schematic hardware configuration of the server apparatus 10. The server apparatus 10 includes a microprocessor unit (MPU) 12, a nonvolatile memory 14 for storing BIOS (Basic Input Output System), and a memory 16 such as a RAM for providing a work memory space that is used by programs executed by the MPU 12. Upon power-on, the MPU 12 reads the BIOS from the nonvolatile memory 14 to check the system and manage an input-and-output apparatus 26.

A storage apparatus 20 such as a hard-disk drive is coupled to a memory control interface 18, which is coupled to the MPU 12 via an internal bus 22. The storage apparatus 20 performs data writing and data reading in response to an input and output request supplied from the MPU 12. The storage apparatus 20 provides a memory space that stores activity contexts and that is used for the purpose of information sharing in collaborative activity (which memory space will hereinafter be referred to as a collaborative activity space). The memory control interface 18 is an interface for managing inputs into and outputs from the storage apparatus 20, which may comply with a standard such as IDE (Integrated Device Electronics), ATA (AT Attachment), serial ATA, or Ultra-ATA. The MPU 12 controls a serial or parallel interface 24 such as USB or IEFE1164 through the internal bus 22 to communicate with the input-and-output apparatus 26 such as a keyboard, mouse, printer, etc., thereby receiving inputs from a user and outputting outputs to a user via the printer or the like.

The server apparatus 10 includes a VRAM 28 and a graphic chip 30 to process video signals in response to instructions from the MPU 12 to display data on a display apparatus 32. The MPU 12 also communicates with a network I/F (NIC: network interface card) 34 via the internal bus 22, thereby providing for the server apparatus 10 to communicate with an external client apparatus via a network 36. In the present embodiment, the server apparatus 10 may communicate with an external server apparatus (not shown) via the network 36 to implement a distributed environment system by synchronizing data.

The server apparatus 10 reads a program stored in a memory device such as the nonvolatile memory 14, the storage apparatus 20, a NV-RAM (not shown), or an SD card (not shown), and expands the program in the memory space of the memory 16, thereby implementing various functions and processes as will be later described under a proper operating system (OS). In the present embodiment, the server apparatus 10 is not limited to an information processing apparatus having a particular architecture. Even though the server apparatus 10 may have architecture suitable for UNIX (registered trademark), AIX, or LINUX (registered trademark), for example, such architecture is not a limiting example as understood by the fact that these OSs may have similar functions. A client apparatus accessing the server apparatus 10 may be implemented by use of the same or similar hardware configuration as the configuration illustrated in FIG. 1.

Figure 2:
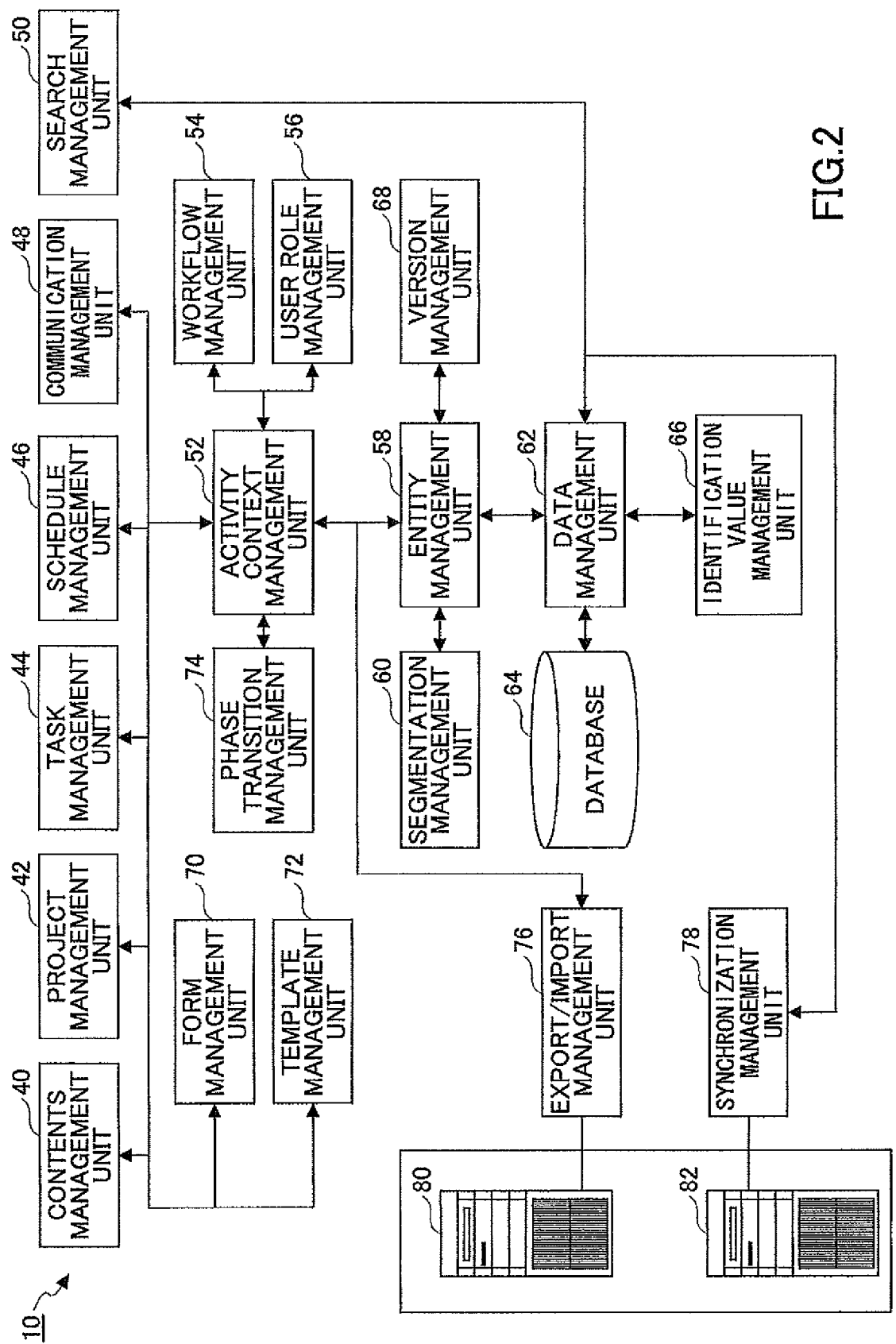
FIG. 2 is a functional block diagram of the server apparatus illustrated in FIG. 1.

FIG. 2 is a functional block diagram of the server apparatus 10 according to the present embodiment. The server apparatus 10 of the present embodiment includes various types of management units 40 through 48 that provide a work environment for creating, viewing, editing, and removing shared information, which is shared by a plurality of users in the collaborative activity space. The contents management unit 40 provides a work interface for creating, viewing, editing, and removing shared contents and the like in collaborative activity. More specifically, the contents management unit 40 provides a function of a contents browser for presenting a list of contents relevant to the user, and also provides functions of a contents viewer and contents editor for viewing and editing contents. In the description of the present embodiment that follows, the contents management unit 40 will be used for documents. In other embodiments, the contents management unit 40 may be used for spread sheets, drawing data, image data, music data, moving-picture data, multimedia data, etc. A project management unit 42 provides a work interface for creating, viewing, editing, and removing activity plans and activity records in collaborative activity. More specifically, the project management unit 42 provides a function of a project browser for presenting a list of projects relevant to the user, and also provides functions of a project viewer and project editor for viewing and editing Gantt charts or the like indicative of project activity plans and activity records.

A task management unit 44 provides a work interface for creating, viewing, editing, and removing activity items in collaborative activity. More specifically, the task management unit 44 provides a function of a TODO interface for presenting a list of activity statuses for activity items inclusive of the activity items relevant to the user, for adding and removing activity items to and from the TODO list, and for modifying activity statuses. The task management unit 44 also provides a notification interface for providing a time period reminder notice, an information notice generated in response to an activity status of another user, an alert notice indicative of the passing of a due date, and an error notice for other purposes. A schedule management unit 46 provides a work interface for creating, viewing, editing, and removing scheduled events on the calendar in collaborative activity. A communication management unit 48 provides a work interface for creating, viewing, editing, and removing messages exchanged between users in collaborative activity. More specifically, the communication management unit 48 serves to provide a bulletin board function and the like.

In the present embodiment, the management units 40 through 48 described above use an operation window as a graphical user interface (GUI) on which users work, and present such an operation window on the browser of a client apparatus through a network by use of a Web server function, for example. The management units 40 through 48 then receive instructions entered through the GUI to perform processing. The GUI may also be presented on the display apparatus 32 of the server apparatus 10, so that processing is performed in response to instructions entered through the GUI by a user using a mouse or the like. Each user uses the management units 40 through 48 to create, view, edit, and remove shared information that may be contents, activity plans, activity records, activity items, scheduled events, and messages.

The server apparatus 10 of the present embodiment further includes a workflow management unit 54, a user role management unit 56, an activity context management unit 52, an entity management unit 58, a segmentation management unit 60, a data management unit 62, a database 64, and a phase transition management unit 74. The user role management unit 56 serves to define user roles in collaborative activity, and manages information regarding users and roles together with authority regarding the shared information. More specifically, the user role management unit 56 manages identification values indicative of collaborative activity spaces, user identification values for identifying users, role identification values indicative of roles of the users in collaborative activity, and authorities given to the users with respect to the shared information in such a manner that they are associated with each other. Roles given to the users may include, in the case of document creation activity, a manager for managing the task of creating a document, a creator instructed to create the document, and a reviewer instructed to review the document, for example. Authorities with respect to shared information may include manager authority, create authority, edit authority, remove authority, view-only authority, authority modification authority, examination authority, and approval authority, for example.

The workflow management unit 54 is used by a user to manage the progress statuses of ongoing activities by use of the management units 40 through 48 and to define workflows relating to a plurality of activities. A workflow defines activities that need to be performed after the completion of given activities. In the case of document creation activity, for example, a workflow defines a series of activity items such as a document creation, a document viewing and review comment creation, a review comment viewing and document editing, and an approval of completion of document creation. A workflow may be defined by associating roles and/or users with the activity items.

The activity context management unit 52 resides between the management units 40 through 48 for providing the work interfaces as previously described and the entity management unit 58 for managing a collaborative activity space. The activity context management unit 52 serves as an intermediary for all activities performed by users using the management units 40 through 48, so that proper activity environments and activity statuses are presented on a user-specific basis. Activities performed in collaborative activity spaces by use of the management units 40 through 48 are processed such that a collaborative activity space identification value indicative of a collaborative activity space, a parent collaborative activity space identification value indicative of a collaborative activity space serving as a parent in a hierarchical structure, shared information to work on, a user identification value for identifying a user who has performed the work, a role identification value associated with the user identification value, and an activity content identification value indicative of the activity content (i.e., what the activity is) are associated with each other in the activity context management unit 52. In the present embodiment, a collaborative activity space is defined separately for each shared information item, and collaborative activity spaces related to each other as parents and children may constitute a tree structure. With the use of such a tree structure in the present embodiment, a predetermined activity may be divided into a plurality of activities for the purpose of providing details, and a plurality of activities may be put together for management purposes. The activity context management unit 52 supplies shared information to the entity management unit 58 for registration therein as a set obtained by combining a collaborative activity space identification value, a parent collaborative activity space identification value, a user identification value and role identification value (a user identification value and role identification value will hereinafter be referred to collectively as user information), and an activity content identification value.

The phase transition management unit 74 manages which one of the activity environments corresponding to the respective management units 40 through 48 is being used when the activity context management unit 52 performs processing. The workflow management unit 54 detects an updating of information managed by the activity context management unit 52 in response to a notice, and notifies relevant users of the updating of information by use of the task management unit 44 or the communication management unit 48 through the activity context management unit 52. These users relevant to the updating of information can check an information notice or message indicative of the updating of information when accessing a notice interface or bulletin board.

The entity management unit 58 uses the segmentation management unit 60 to obtain information fragments relevant to actual activities performed with respect to shared information from a data format that is a set of shared information, user information, and an activity content identification value processed by the activity context management unit 52. The entity management unit 58 then creates a set of the information fragments, user information, and an activity content identification value to perform conversion into a data format that is treatable in a unified manner by the data management unit 62. The segmentation management unit 60 divides shared information processed by the activity context management unit 52 into information fragments treatable by the data management unit 62 when the shared information is operated. The data management unit 62 manages management data in a unified manner, and causes the management data to be stored in the database 64 in the data format organized by the entity management unit 58. The entity management unit 58 also acquires management data, and reconfigures the management data into a data format that is a set of shared information, user information, and an activity content identification value, which is treatable by the activity context management unit 52.

The server apparatus 10 of the present embodiment further includes a form management unit 70 for managing forms for entering information to be used in the management units 40 through 48, and includes a template management unit 72 for managing templates for entering information to be used in the management units 40 through 48. Moreover, the server apparatus 10 of the present embodiment includes a version management unit 68 for managing the history of activities performed on the shared information through the entity management unit 58, a search management unit 50 for searching for management data in the database 64 managed by the data management unit 62 according to keywords and for presenting a list of management data containing the entered keywords, and an export/import management unit 76 for managing inputs and outputs between an external system 80 and the entity management unit 58 to convert data between a data format used by the external system and the data format usable by the entity management unit 58.

The server apparatus 10 of the present embodiment further includes an identification value management unit 66 and a synchronization management unit 78. The identification value management unit 66 assigns a data identification value unique in the entire distributed environment to management data managed by the data management unit 62. The synchronization management unit 78 notifies an external system of an updating of the management data in the server apparatus 10. Further, the synchronization management unit 78 updates the management data in the server apparatus 10 in response to a notice of update of management data in the external system, thereby synchronizing management data between systems in the distributed environment in which a plurality of systems operate. In the present embodiment, management data are identified by unique identification values through a network in the distributed environment, so that a collaborative activity can be performed from any system on the network. Further, the synchronization management unit 78 synchronizes management data immediately upon being connected to the network after some work is locally performed in a state disconnected from the network. This makes it possible to cause updates made during local work to be reflected in a global setting.

The embodiment described above has been directed to an example in which the management units for providing work interfaces such as the contents management unit 40, the project management unit 42, the task management unit 44, the schedule management unit 46, the communication management unit 48, and the search management unit 50 are provided in the server apparatus 10. Alternatively, provision may be made such that part of the functions of the management units for providing work interfaces may be implemented as a plug-in function of a browser in a client apparatus, for example, with the remaining functions being implemented in the server apparatus. In the following, a description will be given of a case in which a plurality of users perform activities by use of the server apparatus 10 from their respective client apparatuses on the network.

Figure 3:
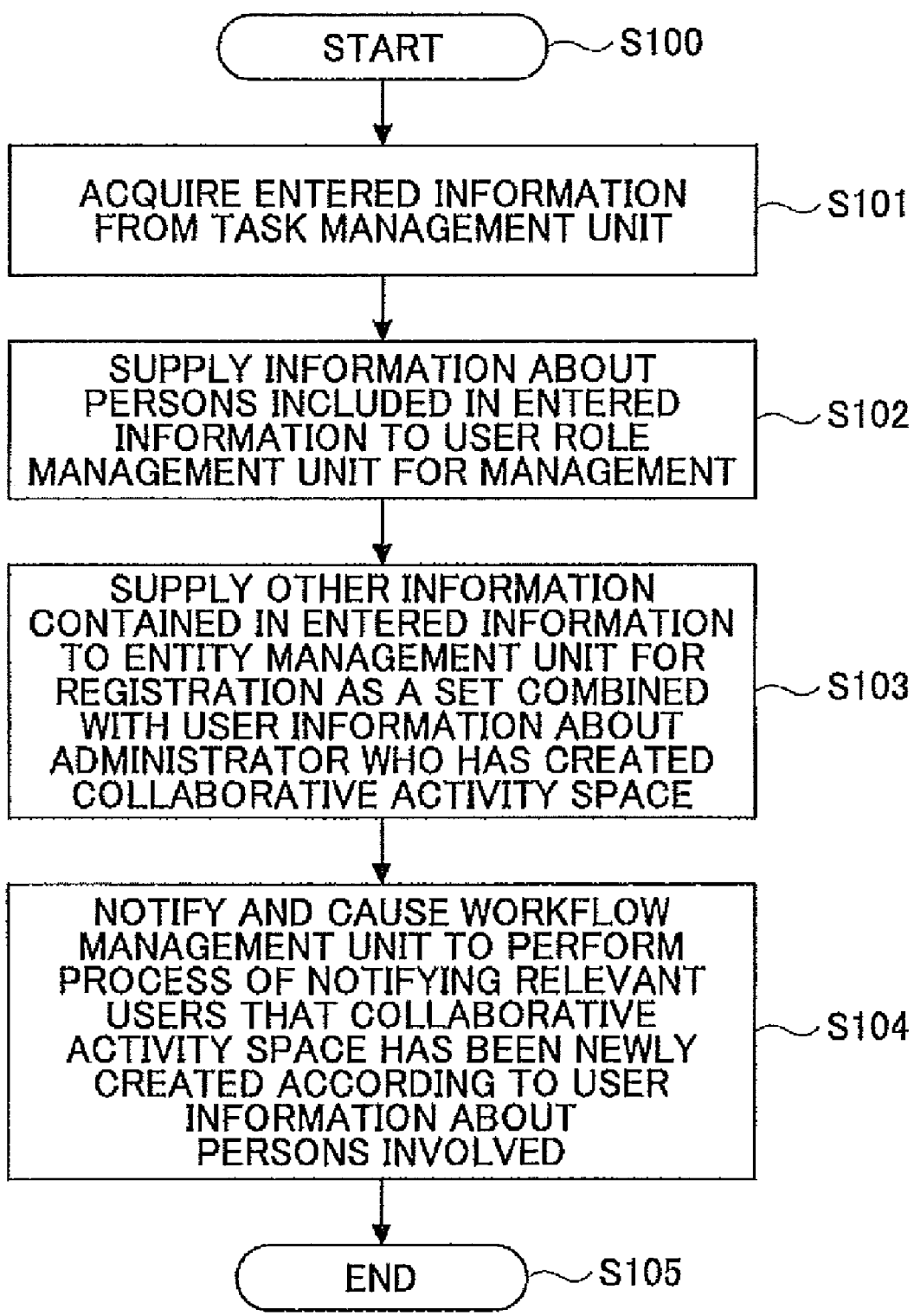
FIG. 3 is a flowchart illustrating a procedure of newly creating a collaborative activity space that is performed by the activity context management unit.

The procedure of newly generating a collaborative activity space will be described first. FIG. 3 is a flowchart illustrating a procedure of newly creating a collaborative activity space that is performed by the activity context management unit. In the following, a description will be given of an example in which the task management unit 44 is used to create a collaborative activity space. A management that is used to create a collaborative activity space is not limited to the task management unit 44. Alternatively, the project management unit 42 may be used to create a collaborative activity space.

The procedure illustrated in FIG. 3 starts with step S100. In step S101, the activity context management unit 52 acquires entered information from the task management unit 44. The administrator user who manages a collaborative activity, for example, uses templates or the like through the task management unit 44 to enter outline information about the collaborative activity, information about persons involved in the collaborative activity, information about activity items corresponding to the persons involved, information about the due date of activities of activity items, and the like. The entered information is then passed from the task management unit 44 to the activity context management unit 52.

In step S102, the activity context management unit 52 supplies the information about the persons involved in the collaborative activity contained in the entered information to the user role management unit 56 so that this information is managed as user information. In step S103, other information contained in the entered information is supplied to the entity management unit 58 as a set of a collaborative activity space identification value, user information about the administrator who has created the collaborative activity space, and an activity content identification value indicative of the creation, so that collaborative activity information is registered. The information supplied to the entity management unit 58 is converted into a data format treatable by the data management unit 62 for provision to the data management unit 62, by which the information is registered in the database 64.

Upon completing the registration in the database, in step S104, the activity context management unit 52 notifies the workflow management unit 54 of the completion. In response, the workflow management unit 54 performs a process of notifying relevant users that a collaborative activity space has been newly created according to the user information about the persons involved in the collaborative activity managed by the user role management unit 56. These relevant users can check an information notice or message indicative of the creation of a collaborative activity space when accessing a notice interface or bulletin board provided by the task management unit 44. Further, the relevant users can confirm that his/her own activities are listed in the TODO list when accessing a TODO interface provided by the task management unit 44.

Figure 4:
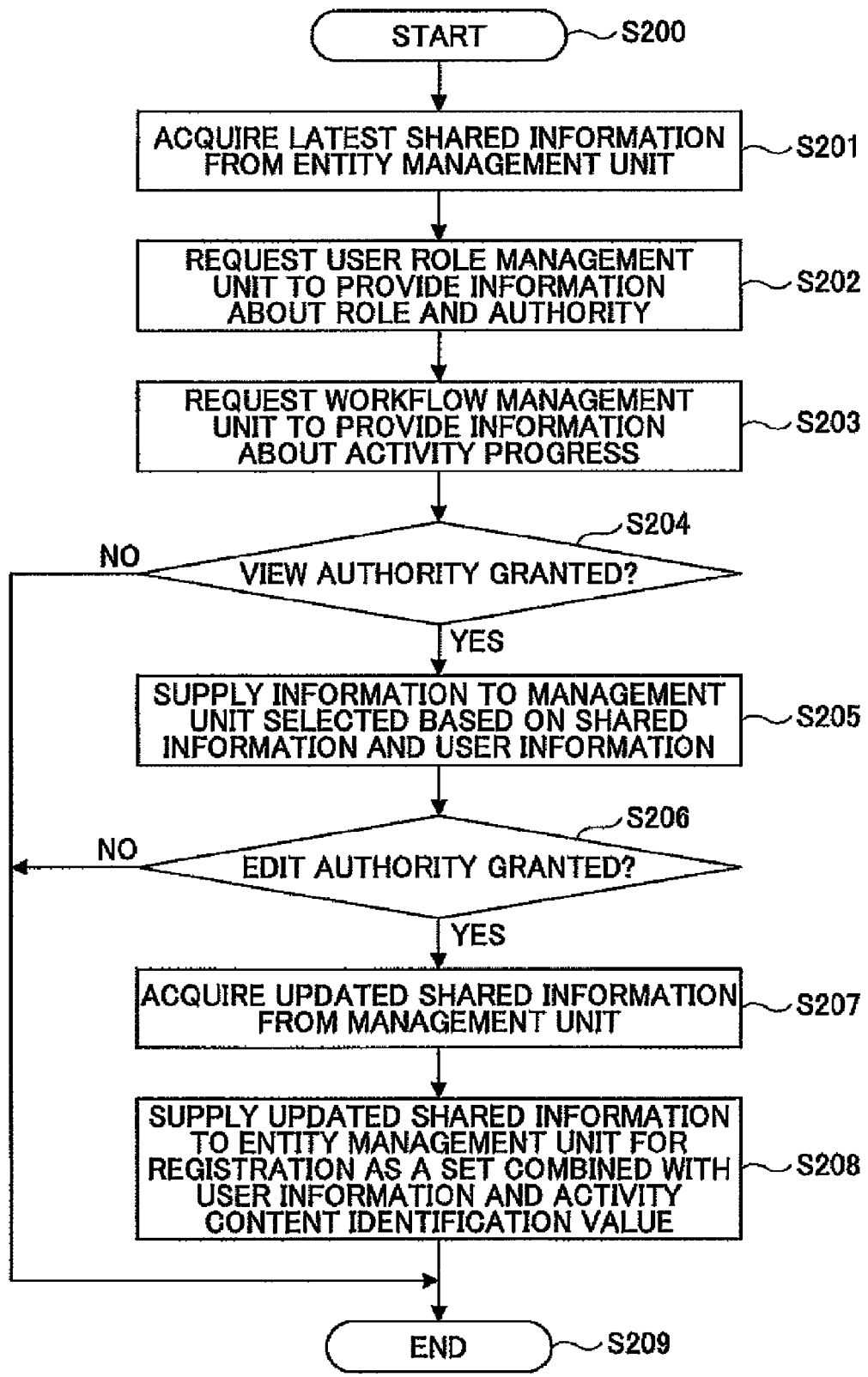
FIG. 4 is a flowchart illustrating a procedure of viewing and editing shared information that is performed by the activity context management unit.

In the following, the procedure of viewing and editing shared information will be described. FIG. 4 is a flowchart illustrating the procedure of viewing and editing shared information that is performed by the activity context management unit. The procedure illustrated in FIG. 4 starts with step S200 in response to a notice sent to the activity context management unit 52 to indicate selection of an activity item when a relevant user selects the activity item on the TODO interface provided by the task management unit 44. In step S201, the activity context management unit 52 supplies the collaborative activity space identification value associated with the activity item to the entity management unit 58 to obtain from the entity management unit 58 the latest version of shared information associated with the collaborative activity space identification value.

In step S202, the activity context management unit 52 supplies to the user role management unit 56 the user identification value of the user who is accessing and the collaborative activity space identification value to acquire the role identification value indicative of the role of this user in the collaborative activity. The activity context management unit 52 also refers to the authority regarding the shared information. In step S203, the activity context management unit 52 supplies to the workflow management unit 54 the collaborative activity space identification value and the activity content identification value acquired together with the shared information to check the progress status of the activity, thereby acquiring the activity content identification value indicative of the activity content of the activity that the user is supposed to perform next.

In step S204, a check is made as to whether the user who is currently accessing has view authority based on the outcome of step S202. If it is ascertained in step S204 that view authority is not granted, the procedure goes to step S209 in which the procedure comes to an end. If it is ascertained in step S204 that at least view authority is granted, the procedure goes to step S205.

In step S205, the activity context management unit 52 selects a management unit to be used based on the role identification value obtained in step S202 and on information indicative of the data format such as an extension attached to the shared information. The activity context management unit 52 then supplies the shared information to the selected management unit to cause a proper work screen (e.g., window) to be displayed. In the case of a document creation activity, for example, the contents management unit 40 is selected to receive shared information when a user playing a creator role is to create a document. Upon receiving the shared information, the management unit displays a work screen responsive to the shared information.

In step S206, a check is made as to whether the user who is currently accessing has edit authority based on the outcome of step S202. If it is ascertained in step S206 that edit authority is not granted, the procedure goes to step S209 in which the procedure comes to an end. If it is ascertained in step S206 that edit authority is granted, the procedure goes to step S207.

The present embodiment is configured such that a user having edit authority can edit the shared information through a work screen (e.g., window) provided by the management unit. In step S207, updated shared information is acquired from the above-noted management unit. In step S208, the updated shared information is supplied for registration to the entity management unit 58 as a set combined with the user identification value and role identification value of the editing user and the activity content identification value indicative of an edit activity. The procedure comes to an end in step S209.

Figure 5:
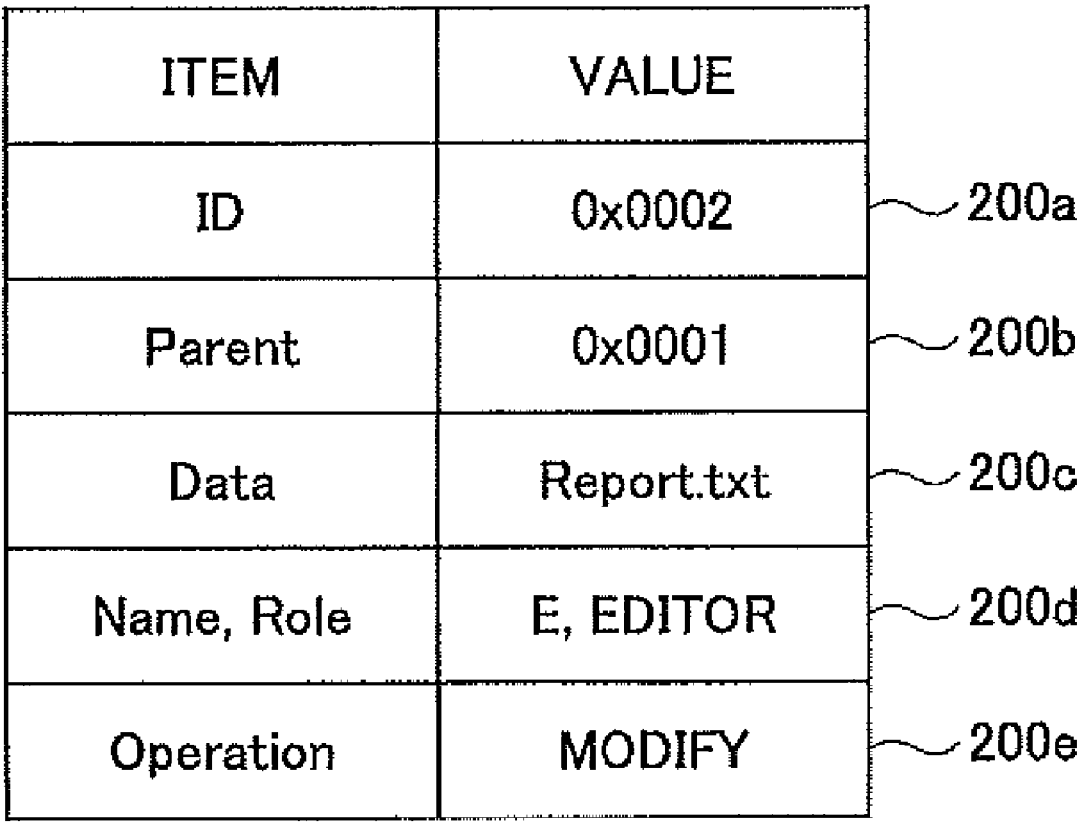
FIG. 5 is a drawing illustrating a data structure of collaborative activity information treated by the activity context management unit.

FIG. 5 is a drawing illustrating a data structure of collaborative activity information treated by the activity context management unit 52. Collaborative activity information 200 illustrated in FIG. 5 includes a field 200a having a collaborative activity space identification value as its entry, a field 200b having a parent collaborative activity space identification value as its entry, a field 200c having collaborative activity data as its entry, a field 200d having a user identification value and role identification value as its entry, and a field 200e having an activity content identification value as its entry. The activity context management unit 52 of the present embodiment mediates processing by use of the data format illustrated in FIG. 5 between the management units 40 through 48 and the entity management unit 58. In the example illustrated in FIG. 5, the parent identification value "0x001", the shared document "report.txt", the user identification value "E", the role identification value "EDITOR", and the activity content identification value "MODIFY" (i.e., edit) are associated with each other. In other embodiments, collaborative activity information may be defined such that a collaborative activity space identification value indicative of a collaborative activity space, a parent collaborative activity space identification value indicative of a collaborative activity space serving as a parent in a hierarchical structure, shared information to work on, an array of a user identification value for identifying a user who can work on the shared information and a role identification value associated with the user identification value, an activity content identification value indicative of the activity performed on the shared information, and an array of a user identification value and a role identification value of a user who has performed the activity are associated with each other.

In the following, the entire process flow will be described by taking a document creation in collaborative activity as an example. In a specific example used in the following description, a document creation in collaborative activity is performed by an administrator user who manages the entire collaborative activity by deciding each person's role and taking care of activity progress, a creator user E who creates a document based on instruction from the administrator user, and a reviewer user R who reviews the document created by the creator user responding to instruction from the administrator user. These three users perform a document creation activity according to the procedure as follows.

(1) The administrator user L selects the user L as a creator and the user R as a reviewer, creates a collaborative activity space for document creation, and notifies the creator user E and the reviewer user R of the contents of the document to be created and their roles in the collaborative activity. (2) The creator user E creates a document in the provided collaborative activity space in accordance with a request for document creation issued by the administrator user L, and notifies the reviewer user R when the document is completed. (3) The reviewer user R reviews the document in response to the notice indicative of the completion of document creation from the creator user E, creates review comments, and notifies the creator user E when the review is completed. (4) The creator user E checks the review comments to modify the document as needed in response to the notice indicative of the completion of document review from the reviewer user R, and notifies the administrator user L when the document is completed. (5) The administrator user L checks the review comments and the modified portions of the completed document as needed in response to the notice indicative of document completion from the creator user E.

Figure 6:
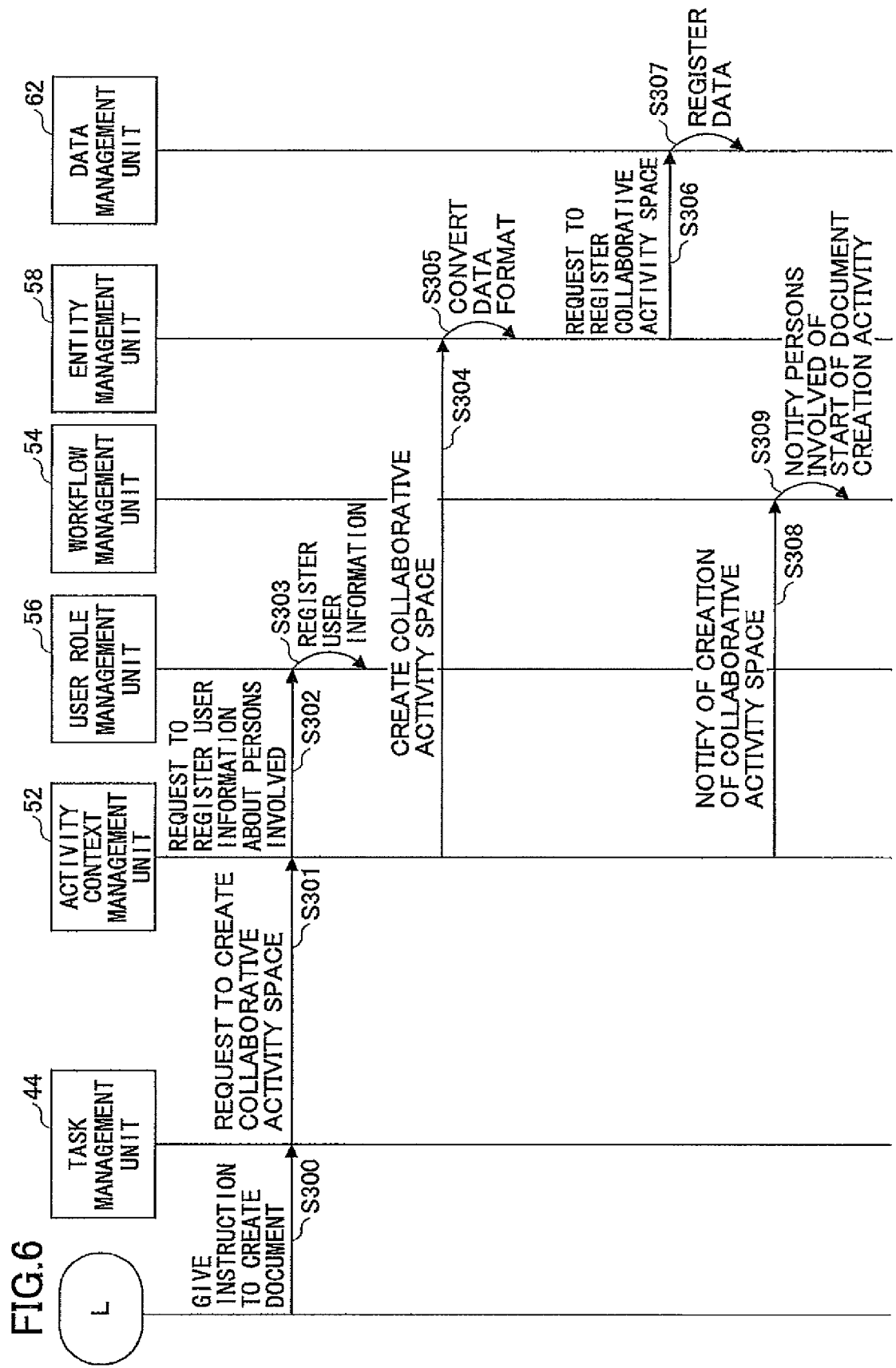
FIG. 6 is a sequence chart illustrating the process of creating a collaborative activity space for document creation.

FIG. 6 through FIG. 10 are sequence diagrams illustrating a collaborative document creation activity performed by three persons involved, i.e., the administrator user L, the creator user E, and the reviewer user R, using the server apparatus 10 of the present embodiment. FIG. 6 is a sequence chart illustrating the process of creating a collaborative activity space for document creation performed by the administrator user L.

The process illustrated in FIG. 6 starts with step S300, in which the task management unit 44 receives an instruction to start document creation and receives information entered from the administrator user L. In step S301, the task management unit 44 having received the instruction to start a document creation activity sends a request to create a collaborative activity space for document creation to the activity context management unit 52 together with the entered information. Upon receiving the request to create a collaborative activity space, the activity context management unit 52 supplies information about the persons involved contained in the entered information to the user role management unit 56 in step S302. In step S303, the user role management unit 56 assigns respective roles to the persons involved, and registers user information. In this example, the user L, user E, and user R are assigned with an administrator role, a creator role, and a reviewer role, respectively, and information indicative of these persons involved is managed as user information.

In step S304, the activity context management unit 52 supplies information about the outline of the document, requests to the respective persons involved, due dates, and so on contained in the entered information to the entity management unit 58 as a set combined with the administrator user information. This is performed concurrently with step S302. In step S305, the entity management unit 58 having received the information converts the received data into a data format treatable by the data management unit 62. In step S306, the entity management unit 58 supplies the converted data to the data management unit 62 to request to register the collaborative activity space. In step S307, the data management unit 62 registers the management data in the database 64.

After the registration in the database 64, the activity context management unit 52 sends in step S308 a notice indicative of the creation of a collaborative activity space to the workflow management unit 54. In step S309, the workflow management unit 54 detects the creation of a new collaborative activity space in response to the notice, and sends a notice indicative of the start of a document creation activity to the persons involved in the collaborative activity managed by the user role management unit 56.

Figure 7:
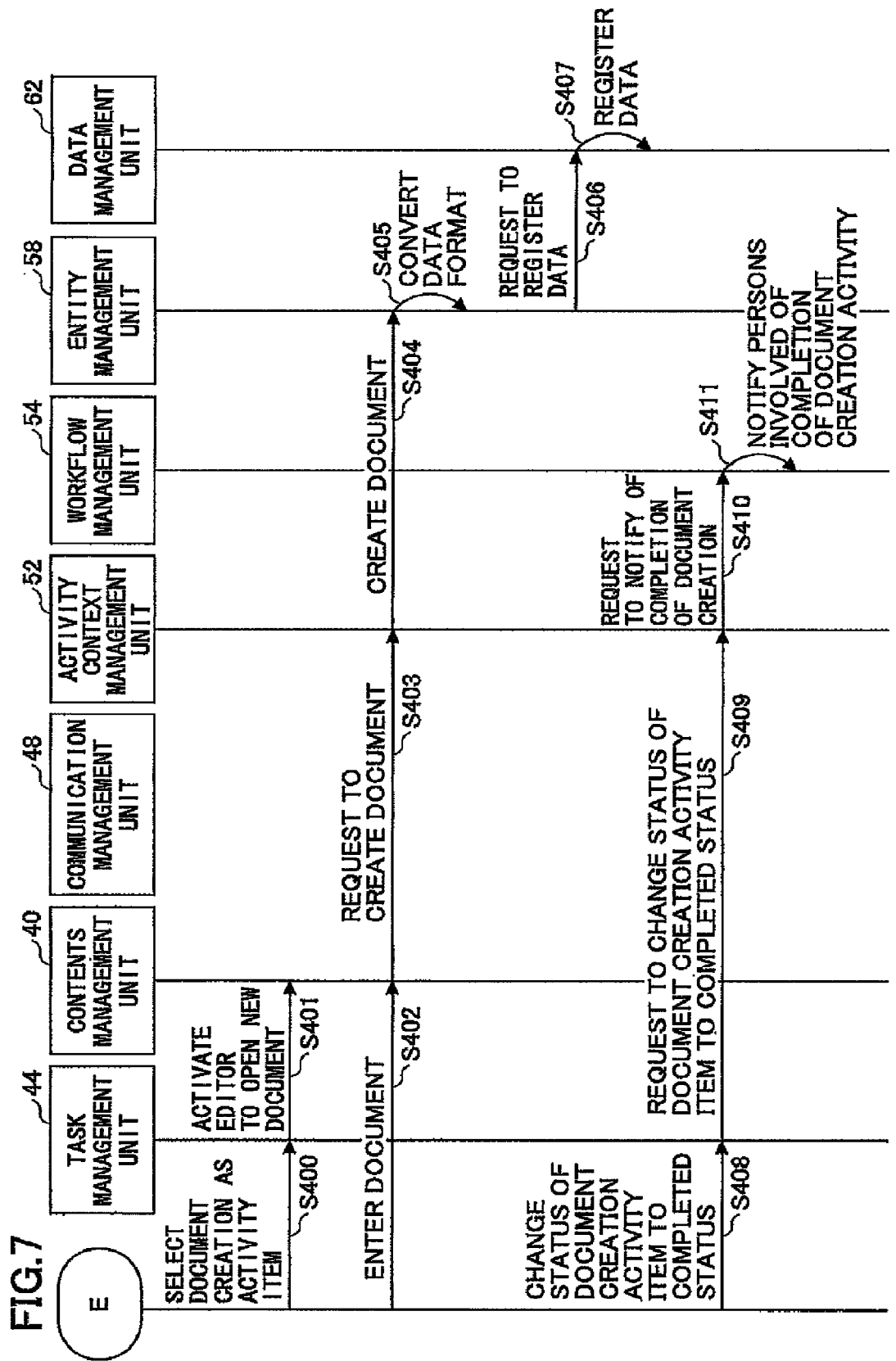
FIG. 7 is a sequence chart illustrating the process of creating a document in a collaborative activity space.

FIG. 7 is a sequence chart illustrating the process of creating a document in a collaborative activity space performed by the creator user E. The process illustrated in FIG. 7 starts with step S400, in which the task management unit 44 receives an indication of selecting an activity item of document creation from the creator user E. In step S401, the task management unit 44 causes the contents management unit 40 through the activity context management unit 52 to activate an editor thereby to open a new document. At this time, the task management unit 44 manages a document creation activity item as being in a start status. The creator user E then creates a shared document through the contents management unit 40. In step S402, the contents management unit 40 receives information indicative of an entered document from the creator user E. In step S403, the contents management unit 40 requests the activity context management unit 52 to create a document with the entered information. In step S404, the activity context management unit 52 having received the request supplies shared document information contained in the entered information to the entity management unit 58 as a set combined with the creator user information. In step S405, the entity management unit 58 having received the shared document information converts the received data into a data format treatable by the data management unit 62. In step S406, the entity management unit 58 supplies the converted data to the data management unit 62 to request to register the data. In step S407, the data management unit 62 registers the management data in the database 64.

In step S408, the task management unit 44 receives an indication of the completion of the document creation activity item supplied from the creator user F who has completed document creation. In step S209, the task management unit 44 sends to the activity context management unit 52 a request to modify the status of the document creation activity item to a completion status. In step S410, the activity context management unit 52 sends a notice indicative of document creation to the workflow management unit 54. In step S411, the workflow management unit 54 detects (i.e., recognizes) the creation of a document in response to the notice, and sends a notice indicative of the completion of the document creation activity to the reviewer user managed by the user role management unit 56.

Figure 8:
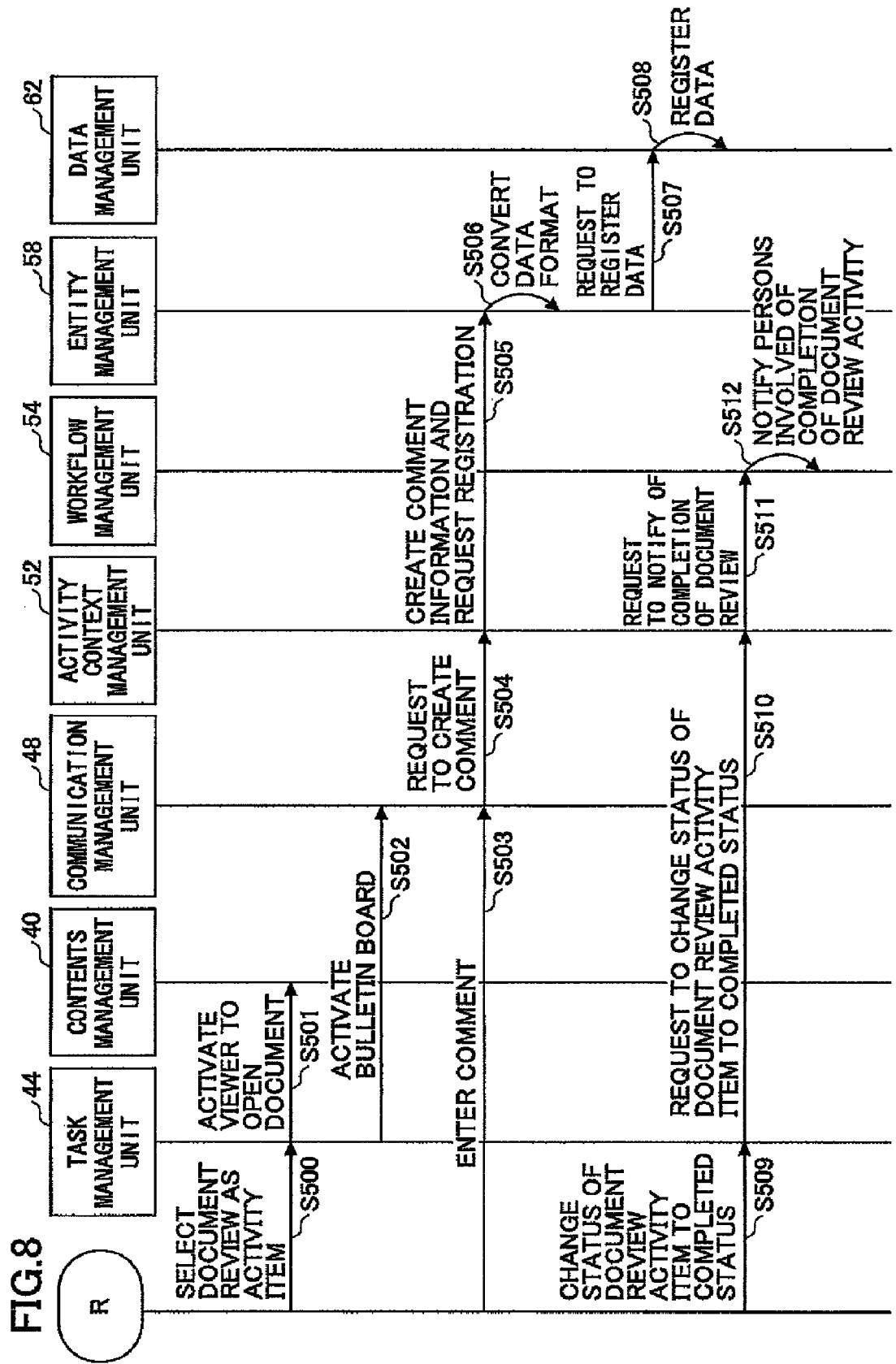
FIG. 8 is a sequence chart illustrating the process of reviewing a document and creating review comments in a collaborative activity space.

FIG. 8 is a sequence chart illustrating the process of reviewing a document and creating review comments in a collaborative activity space performed by the reviewer user R. The process illustrated in FIG. 8 starts with step S500, in which the task management unit 44 receives an indication of selecting an activity item of document review from the reviewer user R. In step S501, the task management unit 44 causes the contents management unit 40 through the activity context management unit 52 to activate a viewer thereby to open the shared document. At this time, the task management unit 44 manages a document review activity item as being in a start status. In step S502, the task management unit 44 causes the communication management unit 48 through the activity context management unit 52 to activate a bulletin board.

The reviewer user R then reviews the shared document and creates review comments through the contents management unit 40. In step S503, the communication management unit 48 receives information indicative of entered comments from the reviewer user R. In step S504, the communication management unit 48 requests the activity context management unit 52 to create comments with the entered information. In step S505, the activity context management unit 52 having received the request supplies shared comment information contained in the entered information to the entity management unit 58 as a set combined with the reviewer user information. In step S506, the entity management unit 58 having received the shared comment information converts the received data into a data format treatable by the data management unit 62. In step S507, the entity management unit 58 supplies the converted data to the data management unit 62 to request to register the data. In step S508, the data management unit 62 registers the management data in the database 64.

In step S509, the task management unit 44 receives an indication of the completion of the document review activity item supplied from the reviewer user R who has completed document review. In step S510, the task management unit 44 sends to the activity context management unit 52 a request to modify the status of the document review activity item to a completion status. In step S511, the activity context management unit 52 sends a notice indicative of review comment creation to the workflow management unit 54. In step S512, the workflow management unit 54 detects (i.e., recognizes) the creation of review comments in response to the notice, and sends a notice indicative of the completion of document review and the creation of review comments to the creator user managed by the user role management unit 56.

Figure 9:
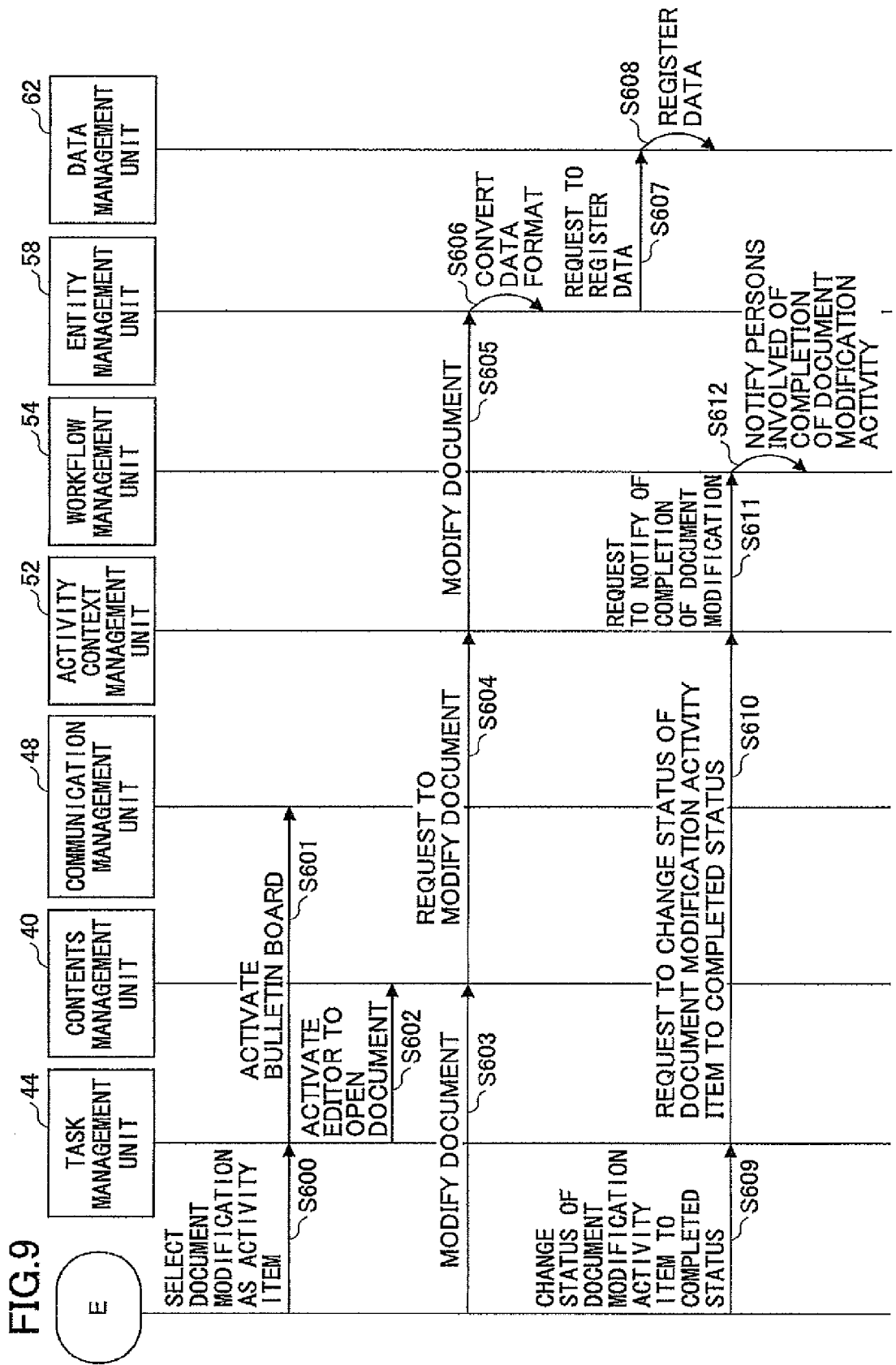
FIG. 9 is a sequence chart illustrating the process of viewing review comments and modifying a document in a collaborative activity space.

FIG. 9 is a sequence chart illustrating the process of viewing review comments and modifying a document in a collaborative activity space performed by the creator user E. The process illustrated in FIG. 9 starts with step S600, in which the task management unit 44 receives an indication of selecting an activity item of document modification from the creator user E. In step S601, the task management unit 44 causes the communication management unit 48 through the activity context management unit 52 to activate a bulletin board. At this time, the task management unit 44 manages a document modification activity item as being in a start status. In step S602, the task management unit 44 causes the contents management unit 40 through the activity context management unit 52 to activate an editor thereby to open the shared document.

The creator user E then reviews the review comments through the communication management unit 48, and edits the shared document through the contents management unit 40. In step S603, the contents management unit 40 receives information indicative of document modification from the creator user E. In step S604, the contents management unit 40 requests the activity context management unit 52 to modify the document with the entered information. In step S605, the activity context management unit 52 having received the request supplies the modified shared document information contained in the entered information to the entity management unit 58 by associating the modified portions with the corresponding review comments as a set combined with the creator user information. In step S606, the entity management unit 58 having received the shared document information converts the received data into a data format treatable by the data management unit 62. In step S607, the entity management unit 58 supplies the converted data to the data management unit 62 to request to register the data. In step S608, the data management unit 62 registers the management data in the database 64.

In step S609, the task management unit 44 receives an indication of the completion of the document modification activity item supplied from the creator user E who has completed document modification. In step S610, the task management unit 44 sends to the activity context management unit 52 a request to modify the status of the document modification activity item to a completion status. In step S611, the activity context management unit 52 sends a notice indicative of modification of the shared document to the workflow management unit 54. In step S612, the workflow management unit 54 detects (i.e., recognizes) the modification of the shared document in response to the notice, and sends a notice indicative of the completion of document modification to the administrator user of the collaborative activity managed by the user role management unit 56.

Figure 10:
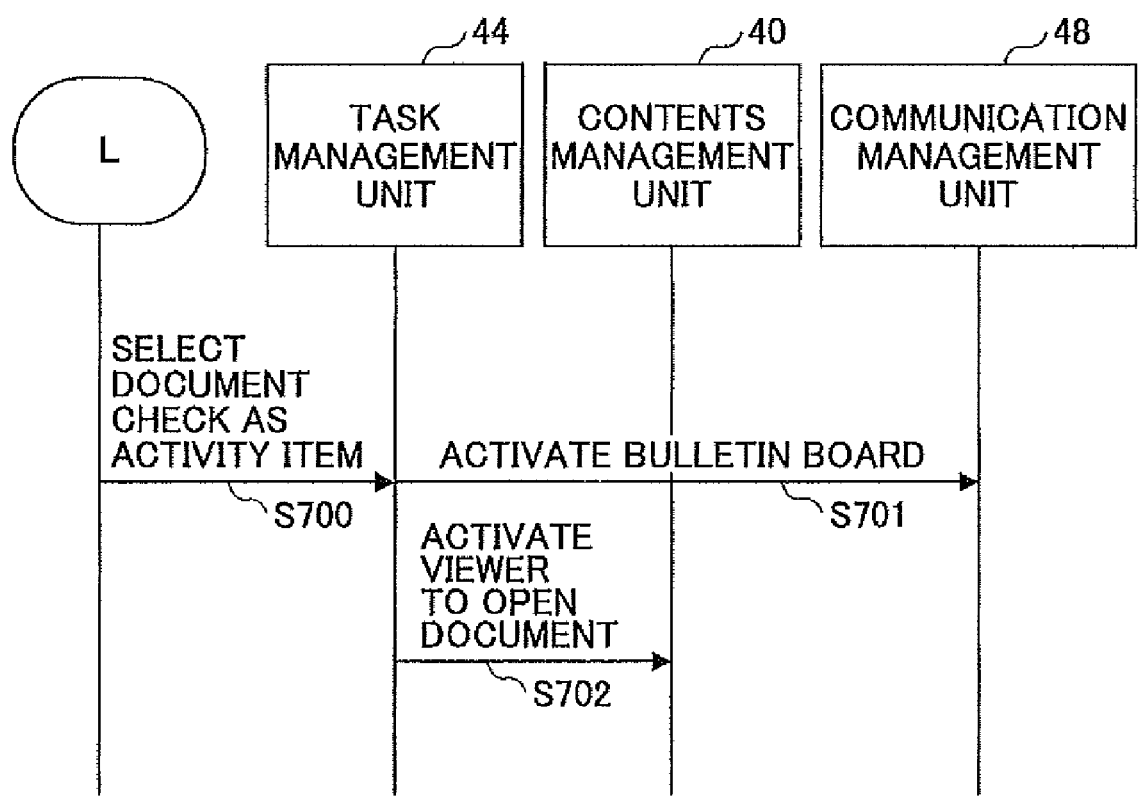
FIG. 10 is a sequence chart illustrating the process of viewing review comments and a modified shared document in a collaborative activity space.

FIG. 10 is a sequence chart illustrating the process of viewing a shared document having review comments and modifications in a collaborative activity space performed by the administrator user L. The process illustrated in FIG. 10 starts with step S700, in which the task management unit 44 receives an indication of selecting an activity item of a modified document final check from the administrator user L. In step S701, the task management unit 44 causes the communication management unit 48 through the activity context management unit 52 to activate a bulletin board. At this time, the task management unit 44 manages a modified document final check activity item as being in a start status. In step S702, the task management unit 44 causes the contents management unit 40 through the activity context management unit 52 to activate a viewer thereby to open the shared document. With the operation described above, the administrator user can read the review comments on the bulletin board to check whether the comments are reflected in the modified shared document.

Figure 11:
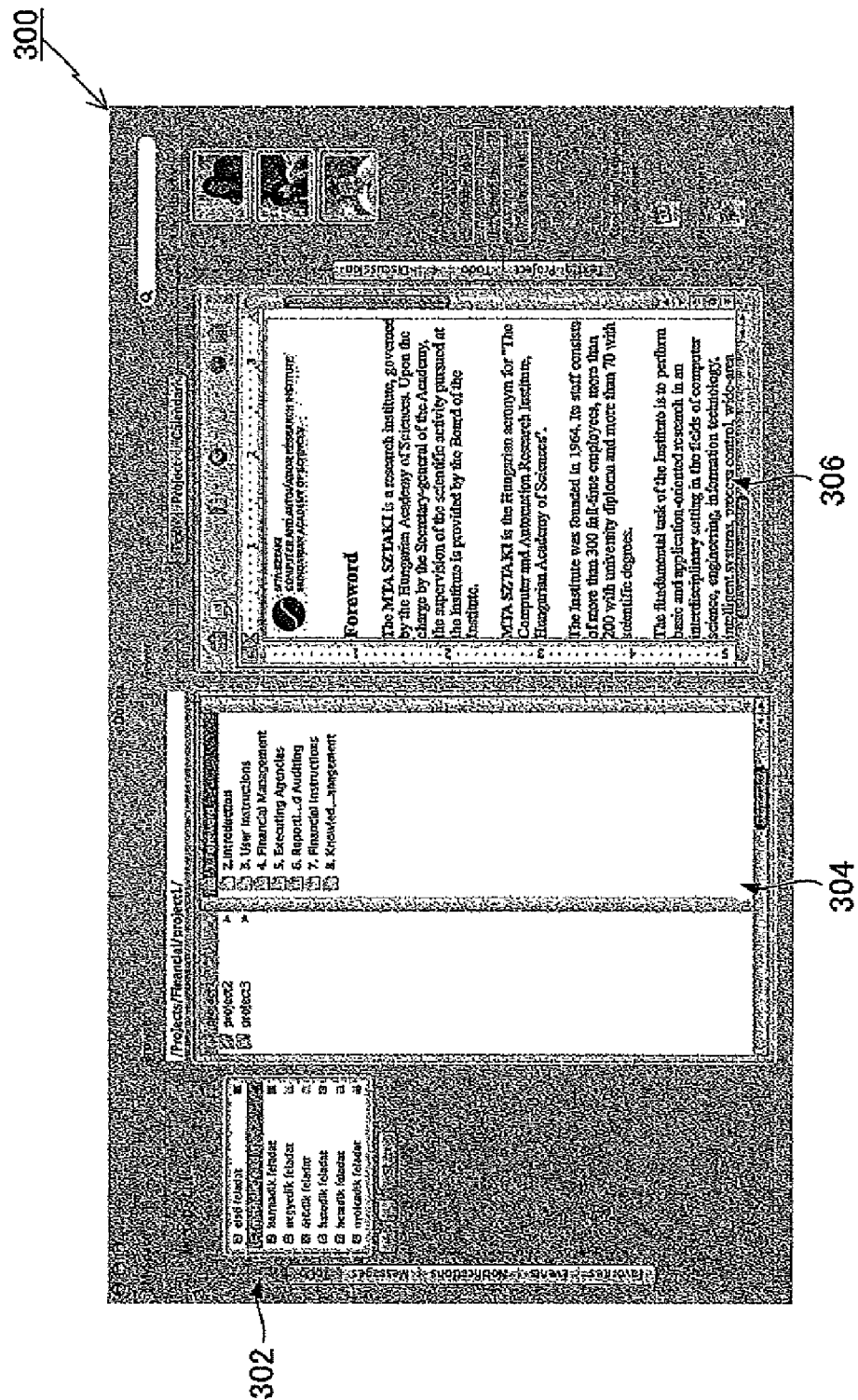
FIG. 11 is a drawing illustrating an embodiment of a GUI screen that is displayed on a display apparatus.

In the following, a description will be given of a GUI screen that is displayed on the display apparatus 32 by the management units 40 through 48 of the present embodiment. FIG. 11 is a drawing illustrating an embodiment of a GUI screen that is displayed on the display apparatus 32 of the server apparatus 10 of the present embodiment. A GUT screen (e.g., window) 300 illustrated in FIG. 11 includes a TODO interface 302 for presenting a list of activity items relevant to a user who is currently accessing the TODO interface 302, a project browser 304 for presenting a list of projects relevant to the user and a list of shared information items relating to the projects, and a document viewer 306 for viewing shared document information. The user uses the GUI screen as shown in FIG. 11 to access the system. The work interfaces provided by the management units 40 through 48 may be configured such that the work interfaces provided by plural management units are displayed side by side on the display apparatus 32.

Figure 12A:
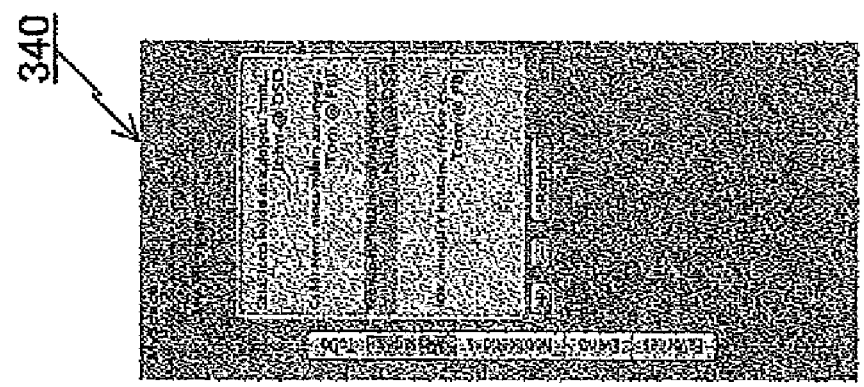
FIGS. 12A through 12D are drawings illustrating other embodiments of a GUI screen that is displayed on a display apparatus.
Figure 12B:
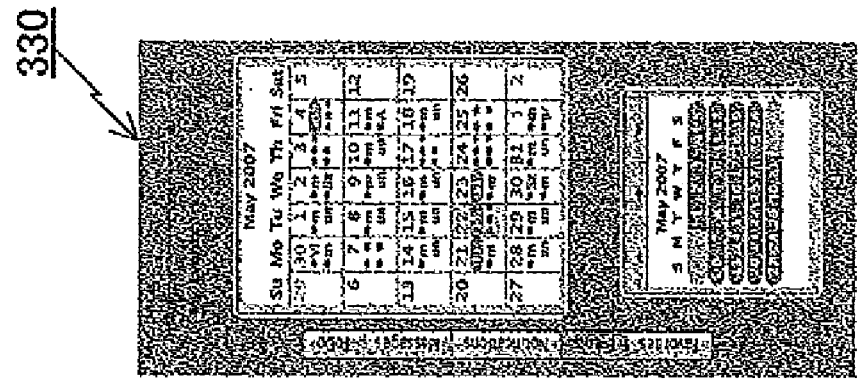
Figure 12C:
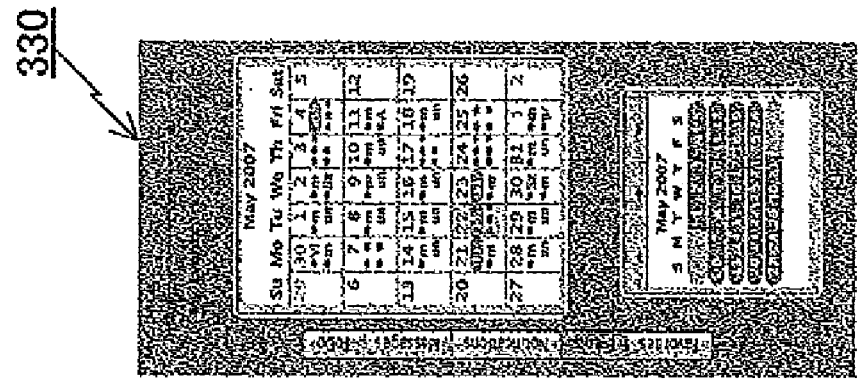
Figure 12D:
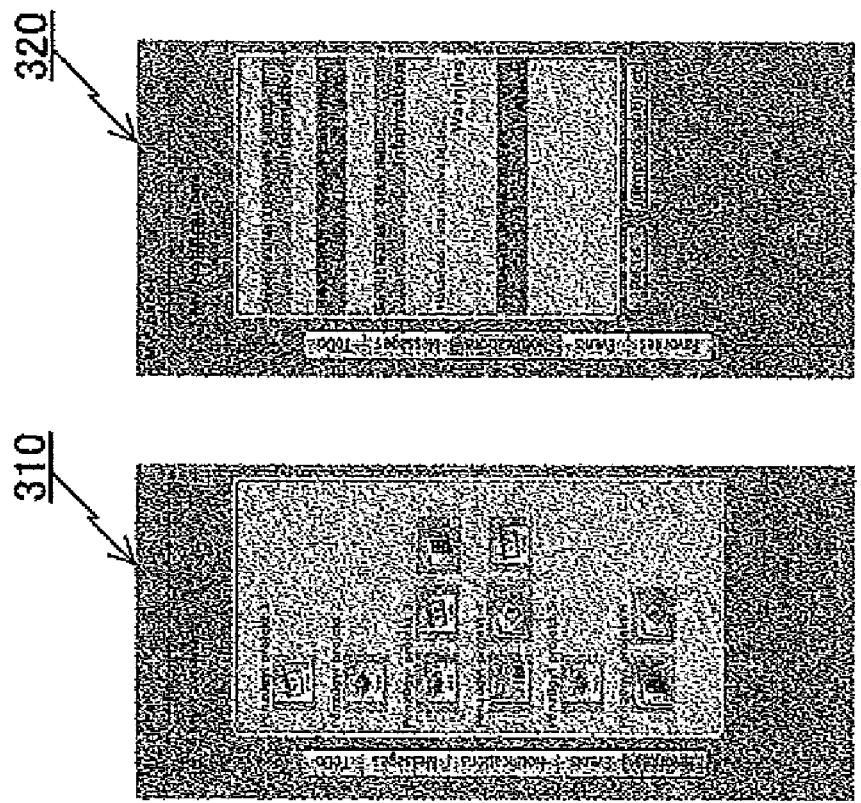

FIGS. 12A through 12D are drawings illustrating other embodiments of a GUI screen that is displayed on the display apparatus 32 of the server apparatus 10 of the present embodiment. FIG. 12A is a drawing illustrating a work interface screen provided by the contents management unit 40. A work interface screen 310 illustrated in FIG. 12A presents a list of contents relating to the user on a project-specific basis, thereby providing a work environment responsive to the user. FIG. 12B is a drawing illustrating a notification interface screen provided by the task management unit 44. A notification interface screen 320 illustrated in FIG. 12B presents an information notice generated in response to a change in an activity status made by another user, an alert notice indicative of the passing of a due date, and other error notices, thereby providing a work environment responsive to the user and activity statuses. FIG. 12C is a drawing illustrating a work interface screen provided by the schedule management unit 46. A work interface screen 330 illustrated in FIG. 12C presents scheduled events for the user, categories or importance levels of these scheduled events, information about scheduled events for other users, etc., thereby providing a work environment responsive to the user and activity statuses. FIG. 12D is a drawing illustrating a bulletin board interface screen provided by the communication management unit 48. A bulletin board interface screen 340 illustrated in FIG. 12D presents messages created by other users regarding the user or collaborative activity, notification messages generated in response to a change in an activity status made by another user, etc., thereby providing a work environment responsive to the user and activity statuses.

Figure 13:
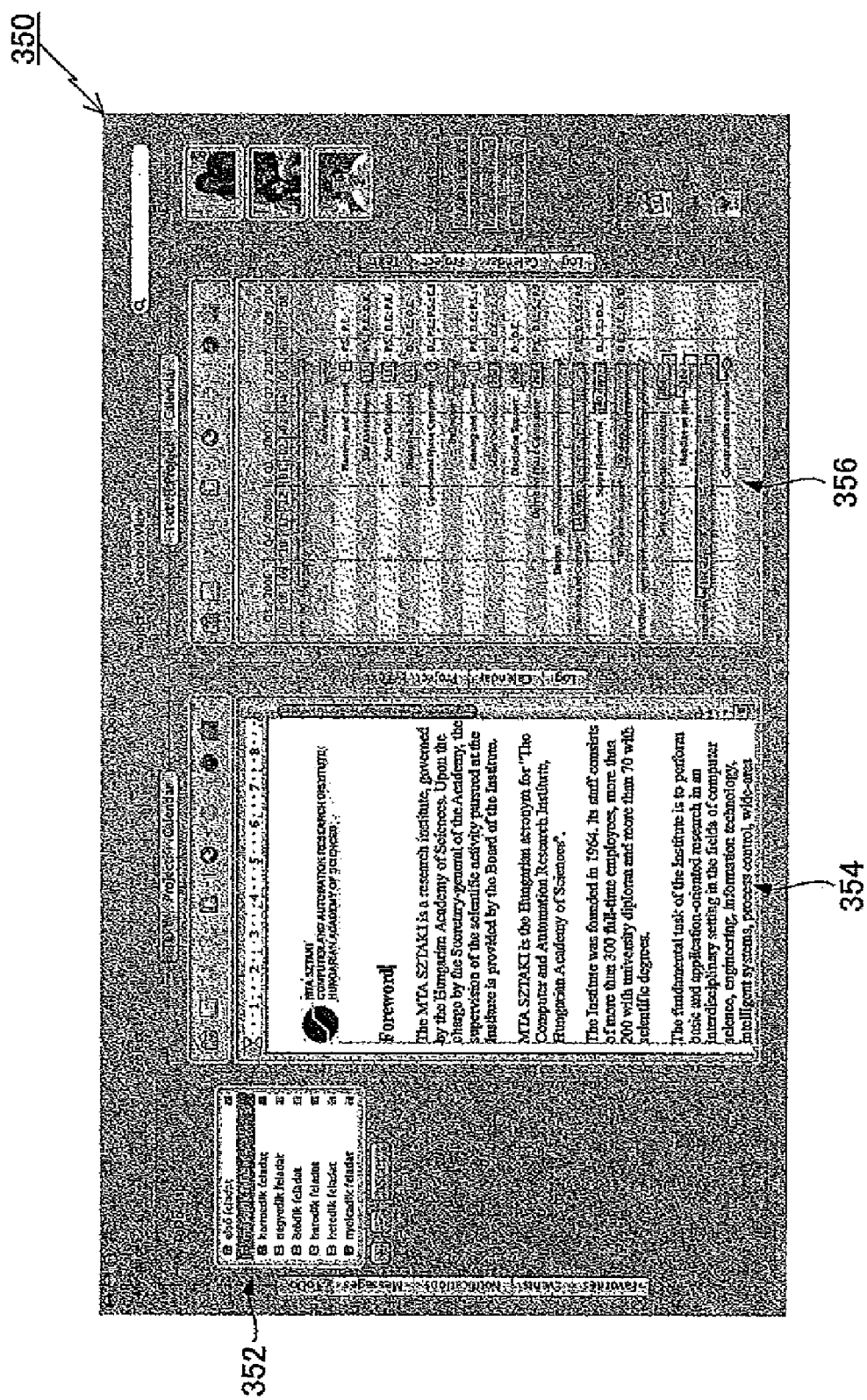
FIG. 13 is a drawing illustrating another embodiment of a GUI screen that is displayed on a display apparatus.

FIG. 13 is a drawing illustrating yet another embodiment of a GUI screen that is displayed on the display apparatus 32 of the server apparatus 10 of the present embodiment. A GUI screen illustrated in FIG. 13 includes a TODO interface 352 for presenting a list of activity items relevant to a user who is currently accessing TODO interface 352, a document editor 354 for editing shared document information, and a project editor 356 for editing activity plans and activity records on a Gantt chart. The user uses the GUI screen as shown in FIG. 13 to view and edit shared documents and projects.

According to the present embodiment described above, a collaborative activity assisting apparatus, a collaborative activity assisting system, a collaborative activity assisting method, and a recording medium having a collaborative activity assisting program embodied therein can perform integrated processing of the functions for assisting and managing a collaborative activity such as contents management, project management, workflow management, schedule management, and communication management, thereby allowing persons involved in the collaborative activity to share necessary information and activity contexts indicative of activity statuses of the collaborative activity. Further, the collaborative activity assisting apparatus, the collaborative activity assisting system, the collaborative activity assisting method, and the recording medium having a collaborative activity assisting program embodied therein make it possible for individual users to perform activities by use of proper functions responsive to their activity statuses, thereby being able to assist the collaborative activity in a smooth, efficient, and user-friendly manner.

The above-described embodiments are directed to an example in which a server apparatus is used as a collaborative activity assisting apparatus. This is not a limiting example, and various types of information processing apparatuses such as a desktop computer, a laptop computer, or the like may be used.

Moreover, the above-described functions may be implemented by a machine-executable program written in an assembly language, C, C++, C#, Java (registered trademark), an object-oriented programming language, or the like. Such a program may be stored in a machine-readable recording medium such as ROM, EEPROM, EPROM, Flash Memory, Flexible Disk, CD-ROM, CD-RW, DVD, SD memory, MO, or the like for distribution.

Further, the present invention is not limited to these embodiments, but various variations and modifications may be made without departing from the scope of the present invention.

The present application is based on Japanese priority application No. 2008-068141 filed on Mar. 17, 2008, with the Japanese Patent Office, the entire contents of which are hereby incorporated by reference.

What is claimed is:

1. A system for assisting a collaborative activity, comprising:
   a plurality of work interfaces configured to provide work environments for shared information that is shared in the collaborative activity;
   a role management unit configured to manage user information obtained by defining for each user a role in the collaborative activity and an authority regarding the shared information;
   a workflow management unit configured to manage activity statuses by using a workflow defined by activity contents and a sequence thereof;
   a collaborative activity registration unit configured to register collaborative activity information regarding the collaborative activity, to which a collaborative activity identification value is assigned; and
   an activity context management unit situated between the plurality of work interfaces and the collaborative activity registration unit to receive entered information from one of the work interfaces, to associate the shared information contained in the entered information with the user information provided by the role management unit and an activity content provided by the workflow management unit to create the collaborative activity information, and to cause the collaborative activity registration unit to register the collaborative activity information,
   wherein the collaborative activity information includes an activity content identification value indicative of an activity content performed on the shared information, and includes a user identification value and a role identification value of a user who has performed the activity content,
   and wherein in a case of performing a new activity content on the shared information, the shared information that is most recent and a first activity content identification value contained in the registered collaborative activity information are obtained based on the collaborative activity identification value, followed by obtaining, from the workflow, a second activity content identification value indicative of an activity content that is to be performed next following the activity content indicated by the first activity content identification value with respect to the most recent shared information.

2. The system as claimed in claim 1, wherein the activity context management unit is configured to further associate the collaborative activity information with an identification value of collaborative activity information corresponding to a parent in a hierarchical structure for registration of the collaborative activity information by the collaborative activity registration unit.

3. The system as claimed in claim 1, wherein the plurality of work interfaces include at least two work interfaces selected from a group consisting of a contents management unit configured to manage contents as the shared information, a project management unit configured to manage plans and records as the shared information, a task management unit configured to manage activity items as the shared information, a schedule management unit configured to manage schedules as the shared information, and a communication management unit configured to manage messages as the shared information.

4. A method of assisting a collaborative activity performed by an apparatus including a plurality of work interfaces configured to provide work environments for shared information that is shared in the collaborative activity, said method comprising:
   receiving, by use of an activity context management unit, information entered from one of the work interfaces;
   providing, from the activity context management unit to a collaborative activity registration unit, collaborative activity information obtained by associating the shared information contained in the entered information with user information and an activity content, the user information being provided by a role management unit for managing the user information and being obtained by defining for a user a role in the collaborative activity and an authority regarding the shared information, and the activity content being provided by a workflow management unit for managing activity statuses by using a workflow defined by activity contents and a sequence thereof; and
   registering, by use of the collaborative activity registration unit, the collaborative activity information to which a collaborative activity identification value is assigned,
   wherein the collaborative activity information includes an activity content identification value indicative of an activity content performed on the shared information, and includes a user identification value and a role identification value of a user who has performed the activity content,
   and wherein in a case of performing a new activity content on the shared information, the shared information that is most recent and a first activity content identification value contained in the registered collaborative activity information are obtained based on the collaborative activity identification value, followed by obtaining, from the workflow, a second activity content identification value indicative of an activity content that is to be performed next following the activity content indicated by the first activity content identification value with respect to the most recent shared information.

5. The method as claimed in claim 4, wherein in the step of registering the collaborative activity information, the activity context management unit further associates the collaborative activity information with an identification value of collaborative activity information corresponding to a parent in a hierarchical structure.

6. A non-transitory machine-readable medium having a program embodied therein executable by an apparatus for assisting a collaborative activity, the program causing the apparatus to function as:

a plurality of work interfaces configured to provide work environments for shared information that is shared in the collaborative activity;

a role management unit configured to manage user information obtained by defining for each user a role in the collaborative activity and an authority regarding the shared information;

a workflow management unit configured to manage activity statuses by using a workflow defined by activity contents and a sequence thereof;

a collaborative activity registration unit configured to register collaborative activity information regarding the collaborative activity, to which a collaborative activity identification value is assigned; and an activity context management unit situated between the plurality of work interfaces and the collaborative activity registration unit to receive entered information from one of the work interfaces, to associate the shared information contained in the entered information with the user information provided by the role management unit and an activity content provided by the workflow management unit to create the collaborative activity information, and to cause the collaborative activity registration unit to register the collaborative activity information, wherein the collaborative activity information includes an activity content identification value indicative of an activity content performed on the shared information, and includes a user identification value and a role identification value of a user who has performed the activity content, and wherein in a case of performing a new activity content on the shared information, the shared information that is most recent and a first activity content identification value contained in the registered collaborative activity information are obtained based on the collaborative activity identification value, followed by obtaining, from the workflow, a second activity content identification value indicative of an activity content that is to be performed next following the activity content indicated by the first activity content identification value with respect to the most recent shared information.

7. The non-transitory machine-readable medium as claimed in claim 6, wherein the activity context management unit is configured to further associate the collaborative activity information with an identification value of collaborative activity information corresponding to a parent in a hierarchical structure for registration of the collaborative activity information by the collaborative activity registration unit.

* * * * *